March 12, 1929. W. F. SHALLENBERGER 1,704,994
WEATHER SHIELD FOR AUTOMOBILES
Filed April 12, 1926
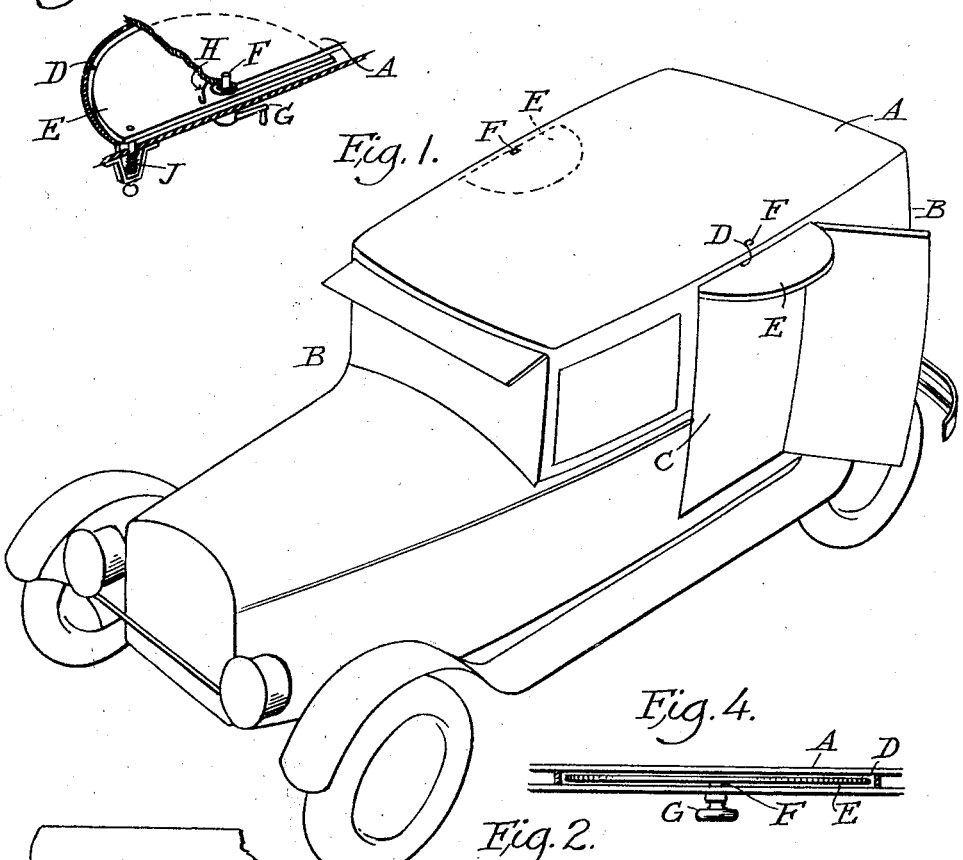
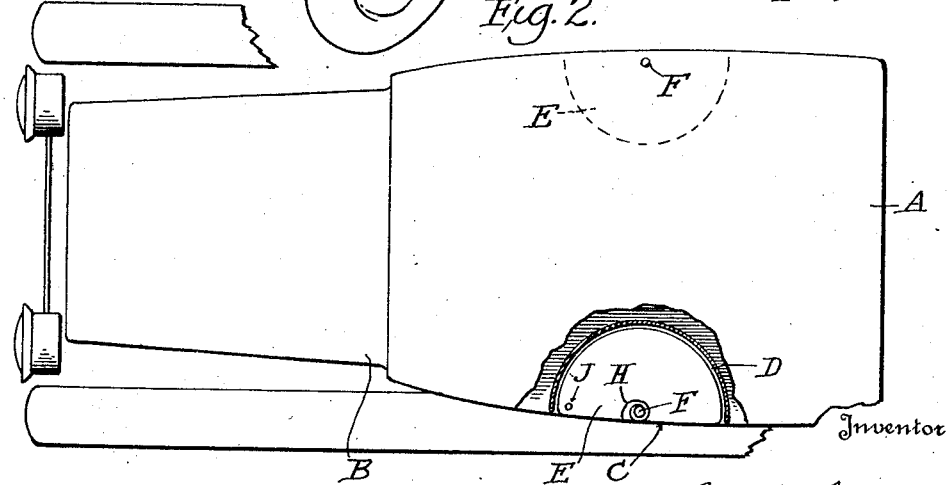

Patented Mar. 12, 1929.

1,704,994

UNITED STATES PATENT OFFICE.

WILLIAM F. SHALLENBERGER, OF ATLANTA, GEORGIA.

WEATHER SHIELD FOR AUTOMOBILES.

Application filed April 12, 1926. Serial No. 101,378.

My invention relates to improvements in weather shields for automobiles or in other words, a device for protecting a person from storm or rays of the sun in entering and leaving an automobile.

One object of my invention is the provision of a device of this character which can be installed in the top of the automobile at the time of manufacture or upon machines in use at a very small expense and which will provide a practical and efficient cover or shield to protect the person from the storm or sun's rays.

Another object of my invention is the provision of a device of the character named which can be instantly thrown into operative position and which can be manually or automatically operated and which will not interfere with the opening and closing of the doors of the machine.

Another object of my invention is the provision of a weather shield which can be installed in the top of the automobile at a very small cost comparatively speaking, which will not detract at all from the embellishment or ornamental appearance of the machine, which will be strong and durable, and which from every point of view will be thoroughly practical and efficient.

With these objects in view my invention consists of a weather shield embodying novel features of construction and combination of parts substantially as described and claimed and as shown in the accompanying drawing, in which:

Figure 1 represents a perspective view of an automobile of the enclosed type provided with my weather shield shown in operative position.

Figure 2 represents a top plan view of an automobile equipped with my weather shield of modified form, the top being broken away to show the relation of the shield to the top of the car.

Figure 3 represents a perspective view of the shield which operates under spring pressure, and Figure 4 represents a front edge view of the manually operated form of my shield.

It will be understood that while my shield or guard is particularly advantageous for use upon enclosed cars, it will be apparent that the improvement may be adapted to the top of an open car, and in use the top A, of the automobile B, is provided above the door openings C, with sockets or chambers D, of semicircular form and located in said sockets are the curved guards or shield E, which are of semicircular form and the desired size and in the manually opened and closed construction are mounted upon pivots F, to which are connected keys or cranks G, and in use it is simply necessary to turn the pivot in one direction to project the shield to operative position, or to turn the pivot in the opposite direction to return the shield to its seat or socket, and in the modified form I provide a coiled spring H, which engages the pivot and shield and acts to return the shield to its socket, a spring catch J, being used to lock the shield in position for use.

From the foregoing description taken in connection with the drawing, it will be apparent that my improvements can be applied to the top of the machine at a very small cost and without detracting from the appearance of the vehicle and that the shield can be readily thrown into or out of operation and that by reason of its providing a shield against the weather at a very small cost its use should prove of great benefit and desirability.

Among the important features of my invention are the semi-circular recesses in the top of the vehicle, the semi-circular shields mounted to swing into and out of said recesses, the catch for holding the shields in open position, the shafts upon which the shields are mounted having the handles for manually operating said shields and the springs for returning the shields to normal position, and the fact that the shields are entirely free from and operate independently from the movement of the doors, which is a great advantage in that the sudden opening and closing of the doors would be likely to pull the shields out of place and wreck the structure.

I claim:

In a weather shield of the character described, the combination with the top of a vehicle having a pair of semi-circular recesses therein, a pair of semi-circular shields pivoted in said recesses and concealed by the walls of said top, springs coiled around the pivots of said shields and acting to turn the shields inward to inoperative position, said shields having an opening in one corner thereof, a vertically disposed pair of spring bolts mounted in the vehicle top, having a handle for manual operation and adapted to engage the openings in said shields, and handles connected to the pivots of said shields for moving said shields to operative position, the said shields being entirely free from the doors of the vehicle and operated manually aside from the operation of the doors.

In testimony whereof I hereunto affix my signature.

WILLIAM F. SHALLENBERGER.